United States Patent

Nagel et al.

[11] Patent Number: 5,774,283
[45] Date of Patent: Jun. 30, 1998

[54] EXTERIOR REARVIEW MIRROR FOR VEHICLES, ESPECIALLY FOR MOTOR VEHICLES

[75] Inventors: Bernd Nagel, Leonberg; Bernd Waldmann, Esslingen, both of Germany

[73] Assignee: Reitter & Schefenacker GmbH & Co. KG, Esslingen, Germany

[21] Appl. No.: 733,347

[22] Filed: Oct. 17, 1996

[30] Foreign Application Priority Data

Oct. 18, 1995 [DE] Germany ............ 195 38 770.8

[51] Int. Cl.[6] .............. G02B 7/182; B60R 1/06; B60R 1/12; G08C 19/00
[52] U.S. Cl. ............ 359/838; 359/872; 362/83.1; 340/426; 340/447; 340/475; 340/825.72; 341/176; 455/352
[58] Field of Search .................. 359/838, 843, 359/871, 872; 362/83.1; 340/426, 447, 475, 478, 825.72; 455/352; 341/176

[56] References Cited

U.S. PATENT DOCUMENTS

| | | |
|---|---|---|
| 4,868,915 | 9/1989 | Anderson, III et al. ......... 340/825.72 |
| 4,873,530 | 10/1989 | Takeuchi et al. . |
| 4,930,742 | 6/1990 | Schofield et al. ............ 359/871 |
| 5,371,659 | 12/1994 | Pastrick et al. ............ 362/83.1 |
| 5,402,103 | 3/1995 | Tashiro .................. 362/83.1 |
| 5,455,716 | 10/1995 | Suman et al. ............. 359/838 |
| 5,499,169 | 3/1996 | Chen .................... 362/83.1 |

FOREIGN PATENT DOCUMENTS

| | | | |
|---|---|---|---|
| 0007735 | 1/1982 | Japan ................ 362/83.1 |
| 0188733 | 11/1983 | Japan ................ 362/83.1 |
| 0218248 | 9/1987 | Japan ................ 362/83.1 |

*Primary Examiner*—Ricky D. Schafer
*Attorney, Agent, or Firm*—Robert W. Becker & Associates

[57] ABSTRACT

An exterior rearview mirror for a motor vehicle has a mirror support and a mirror housing connected with a first end to the mirror support. The mirror housing has a holder for a mirror pane. A turn signal light is positioned in the mirror housing. At least one first receiver for receiving remote control signals is also positioned within the mirror housing.

16 Claims, 4 Drawing Sheets

EXTERIOR REARVIEW MIRROR FOR VEHICLES, ESPECIALLY FOR MOTOR VEHICLES

BACKGROUND OF THE INVENTION

The present invention relates to an exterior rearview mirror for vehicles, especially motor vehicles, comprising a mirror support and a mirror head that includes a holder for the mirror pane.

Exterior rearview mirrors are known in which the mirror head is moved rearwardly, when viewed in the direction of travel of the vehicle, relative to the mirror support by hand or with a motor drive. Furthermore, the holder for the mirror pane within the mirror head can be, in general, adjusted from the interior of the vehicle by the driver. This ensures an excellent field of view for the driver so that a high traffic safety is provided.

It is an object of the present invention to embody an exterior rearview mirror of the aforementioned kind such that the traffic safety of the vehicle is further increased even though a constructively simple embodiment is provided.

SUMMARY OF THE INVENTION

The exterior rearview mirror for a motor vehicle according to the present invention is primarily characterized by:

A mirror support;

A mirror housing connected with a first end to the mirror support;

The mirror housing having a holder for a mirror pane;

A turn signal light positioned in the mirror housing; and

At least one first receiver for receiving remote control signals.

Advantageously, the mirror housing comprises a mounting chamber, and the turn signal light and the at least one first receiver are positioned within the mounting chamber.

Preferably, the mirror housing has a light-transmissive window and the turn signal light is positioned in the mirror housing behind the window. Advantageously, the window is colored.

Preferably, the window is located at a second end of the mirror housing, remote from the mirror support.

The mirror housing has a leading face in a direction of travel of the motor vehicle and the window is positioned within the leading face.

The window is preferably curved in a direction opposite the direction of travel toward a second end of the mirror housing remote from the first end.

The window is preferably also curved in the vertical direction.

The turn signal light may comprise at least one LED or a light-guiding material or a neon light.

Advantageously, the at least one first receiver is positioned behind the window.

The window, at least in an area where the at least one first receiver is positioned, is transmissive for remote control signals.

In a preferred embodiment of the present invention the exterior rearview mirror comprises two first receivers.

The two first receivers preferably have overlapping receiving ranges.

In yet a further embodiment of the present invention the exterior rearview mirror further comprises a second receiver for receiving remote control signals, the second receiver preferably positioned within the mirror support.

The mirror support has a rearward side relative to the direction of travel of the vehicle and the second receiver is positioned at the rearward side.

The turn signal light is preferably integrated into the electric circuit for switching the main turn lights of the vehicle.

In another embodiment of the present invention the turn signal light comprises a separate circuit connected to the current supply of the vehicle.

The at least one receiver may be part of a door locking mechanism of the vehicle and/or a part of a safety mechanism of the vehicle for preventing unauthorized use of the vehicle.

The inventive exterior rearview mirror comprises a mirror head with a turn signal light as well as a receiver for remote control signals. Thus, no separate mounting spaces within the vehicle are required for such a turn signal light and the receiver(s). For mounting these parts, the mirror head of the exterior rearview mirror is used which is already present and can provide the required space. The electrical lines to the turn signal and to the receiver can be guided through the mirror support into the mirror head. For this purpose, there are no additional bores required within the vehicle so that the resulting problems with respect to corrosion can be simply and reliably avoided. The turn signal light is clearly visible within the inventive exterior rearview mirror especially also for traffic participants adjacent to the vehicle. They can timely and clearly recognize the intention of the driver to turn with his vehicle. The receiver(s), also provided within the mirror head, can be reached reliably by remote control signals sent by a corresponding sender so that the driver can actuate, for example, from the exterior the door locks or a safety mechanism that prevents unauthorized use of the vehicle.

BRIEF DESCRIPTION OF THE DRAWINGS

The object and advantages of the present invention will appear more clearly from the following specification in conjunction with the accompanying only drawing.

DESCRIPTION OF PREFERRED EMBODIMENT

Figure 1:
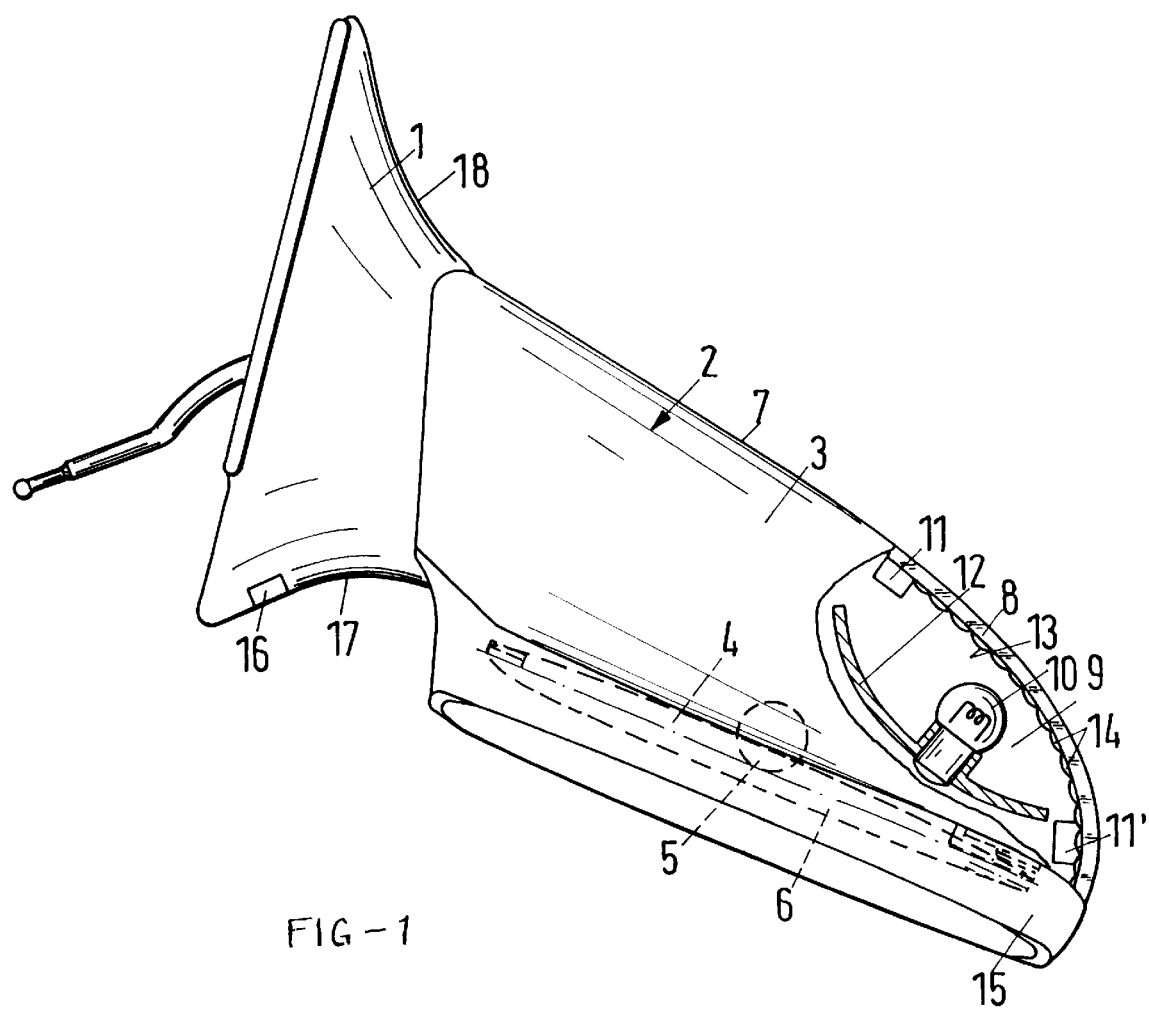
FIG. 1 shows in a top view, partly in section, the inventive exterior rearview mirror with the turn signal light and the receivers.
Figure 2:
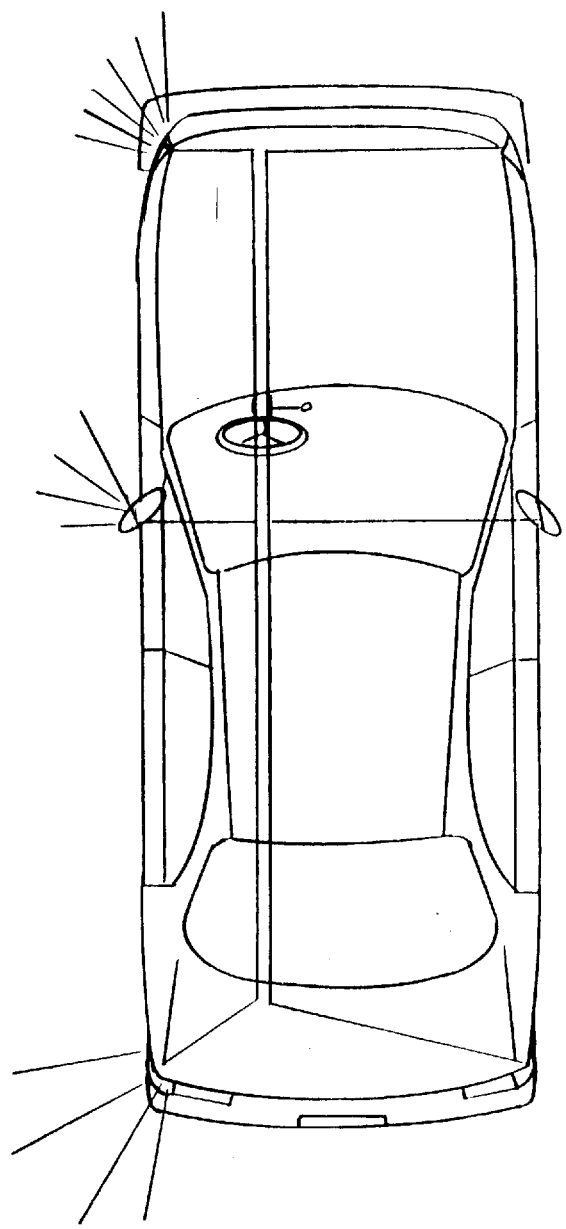
FIG. 2 shows an automobile with front and rear main turn signals and an inventive turn signal (turn indicator) integrated into the exterior rearview mirror, wherein the left turn signals are schematically illuminated and the electrical lines between the turn signals and the turn signal actuator at the steering wheel are shown.
Figure 3:
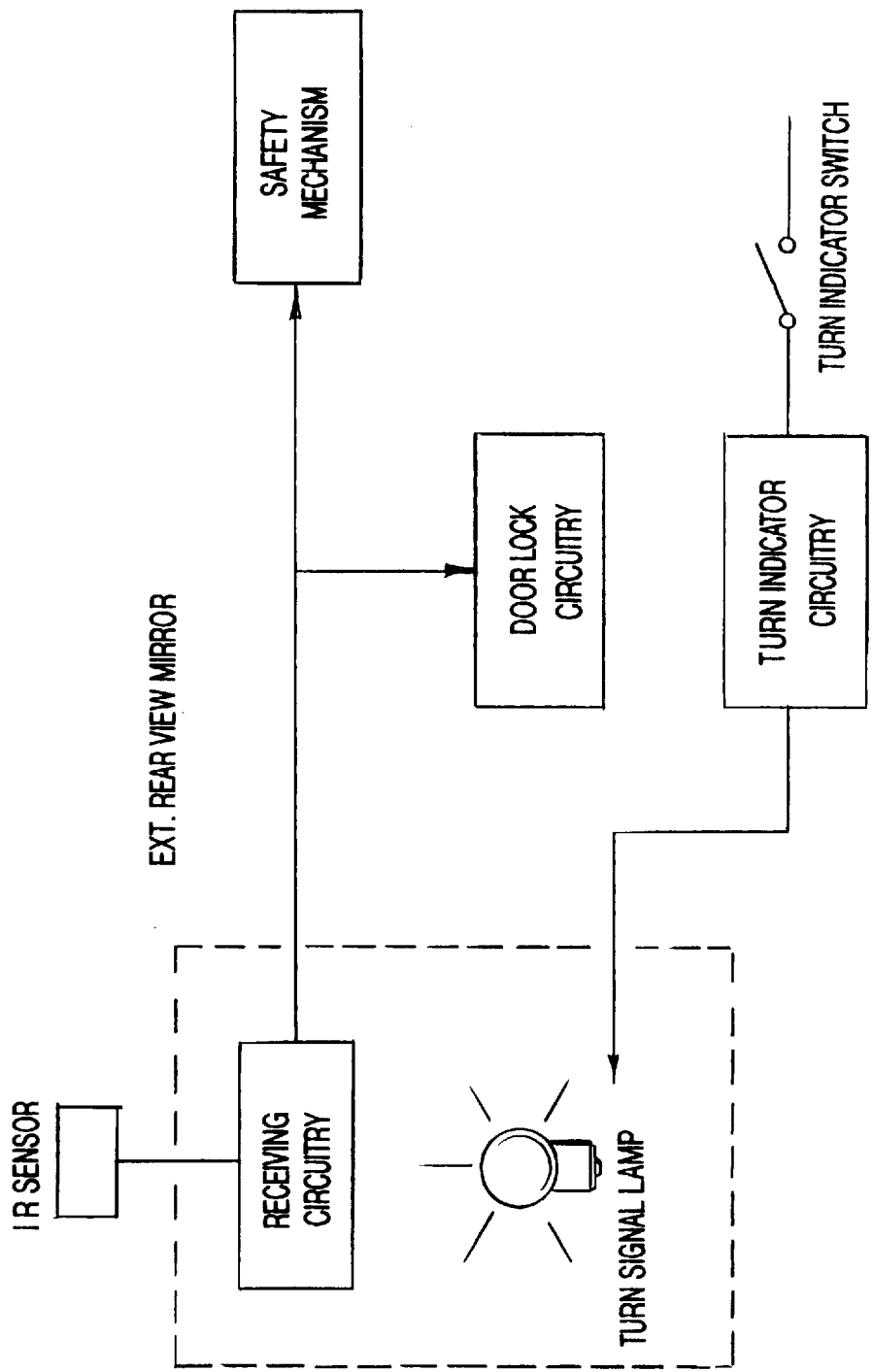
FIG. 3 shows a receiver (IR sensor and receiving circuitry) integrated into the exterior rearview mirror and connected to a door lock circuitry and a safety mechanism.
Figure 4:
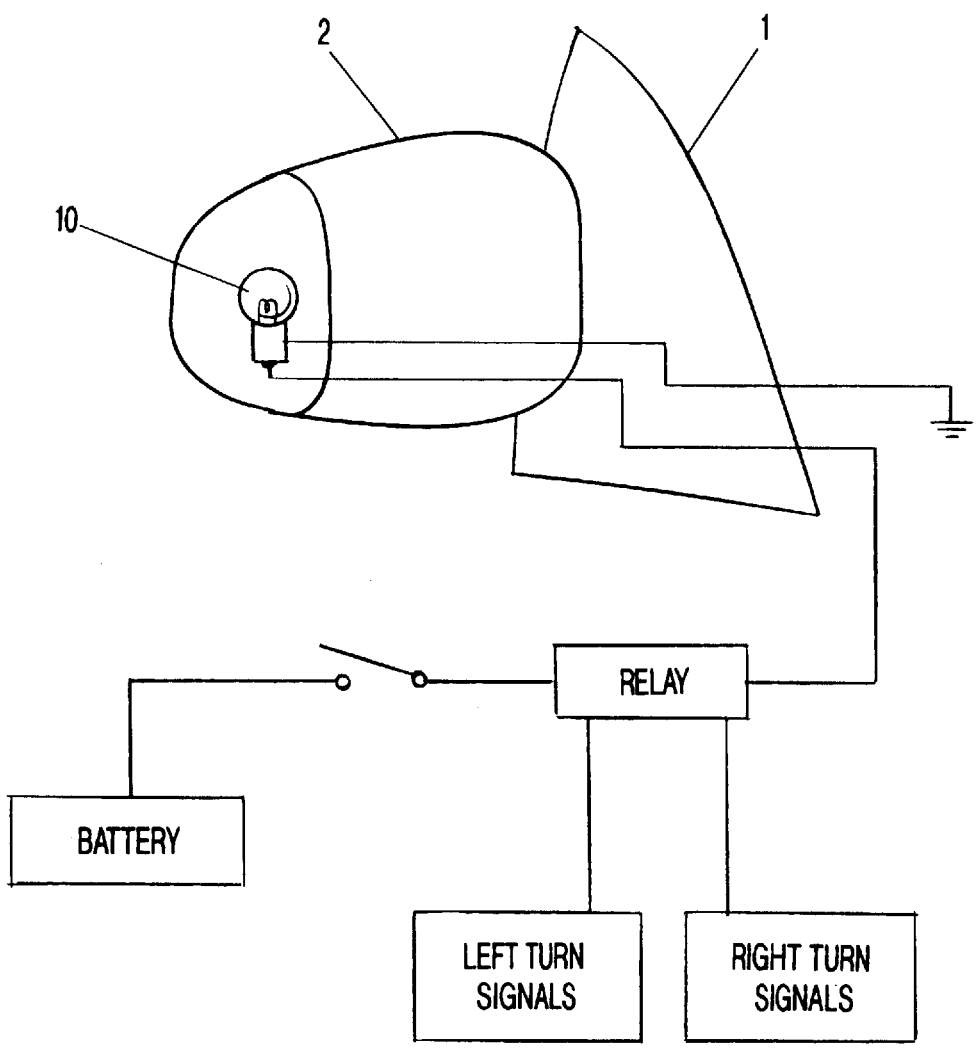
FIG. 4 shows the turn signal light in the exterior rearview mirror and the left and right main turn signals connected to separate circuits.

The present invention will now be described in detail with the aid of a specific embodiment utilizing the only Figure.

The inventive exterior rearview mirror has a mirror support 1 which is connected in a manner known per se to the side of a vehicle, preferably a motor vehicle. The exterior rearview mirror furthermore has a mirror head 2 which extends transversely from the mirror support 1. The mirror head 2 is foldable relative to the mirror support 1. Preferably, the mirror head 2 can be pivoted in the rearward direction (when viewed in the direction of travel) from the position of use, shown in the drawing, into a parking position relative to the mirror support 1.

Such an embodiment of an exterior rearview mirror is well known in the art and is therefore not disclosed in detail.

The mirror head 2 has a mirror housing 3 in which a plate-shaped holder 4 for the mirror pane is provided. The holder 4 is adjustably supported in a manner known per se with a ball joint 5 at the mirror housing 3 and supports a mirror pane 6. The adjustment of the holder 4 can be carried out from the interior of the vehicle manually or with an electric drive.

The mirror housing comprises a light-transmissive window 8 at the leading face 7 which is facing forward in the direction of travel. It covers a mounting chamber 9 in which at least one turn signal light 10 and at least one receiver 11 are provided. The turn signal light 10 may comprise at least one LED, at least one incandescent lamp, light-guiding material or at least one neon light. For securing the turn signal light 10, a support 12 is provided within the mounting chamber 9. The window 8 is comprised of a light-transmissive material such as glass, plastic etc. The back side 13 of the window 8 is advantageously provided with a lens, respectively, prism element 14. With it, the light emitted by the turn signal light 10 is refracted in an optimal manner. The window 8 can be colored orange. However, it is also possible to provide between the turn signal light 10 and the window a filter that is correspondingly colored so that the light emitted by the turn signal light 10 has the required orange color. In this case, the window 8 is made of a clear (colorless) material. Furthermore, it is possible to color the turn signal 10 (i.e., its light producing element) itself.

The window 8 is positioned at the end of the mirror housing 3 remote from the mirror support 1. It extends to a frame 15 that surrounds the opening of the mirror housing 3 in which the mirror pane 6 is secured. Since the leading face 7 of the mirror housing through, in a plan view, extends in a curvature to the rear relative to the direction of travel, the turn signal cannot only be seen from the front but also from the side of the vehicle. This provides high traffic safety. Especially traffic participants (bicyclists, motorcycle riders, pedestrians) which are adjacent to the vehicle thus can easily recognize the intention of the driver to turn even when they are positioned laterally to the vehicle. In the vertical direction the window 8 is also sufficiently large so that a turn signal with a large surface area results.

In the mounting chamber 9 advantageously two receivers 11, 11' are provided which are responsive to infrared radiation, ultrasound radiation etc. These receivers 11, 11' may be part of, for example, a safety mechanism for preventing unauthorized use of the vehicle or a door lock of the motor vehicle. The driver of the motor vehicle can turn on and off the safety mechanism or lock/unlock the door lock from the exterior of the vehicle with the corresponding sender. The receivers 11, 11' are integrated into the corresponding electric circuit of the motor vehicle. In order to provide for a wide reception range, the receivers 11, 11', as shown in the drawing, are positioned within the area of the two ends of the window 8 (viewed in a plan view of the exterior rear view mirror). The window 8, at least in the area of the receivers 11, 11', is transmissive for the corresponding signals. Due to the disclosed arrangement of the receivers 11, 11', the corresponding sender must not be oriented exactly in the direction of the receiver so that the actuation, for example, of the safety mechanism or of the door lock is substantially simplified. The mounting chamber 9, of course, can have positioned therein further receivers in order to be even more independent of the orientation of the sender beam.

It is also possible to provide such an additional receiver 16 within the support of the mirror 1. Advantageously, this additional receiver 16 is positioned at the rearward side 17 of the mirror support 1 so that the corresponding device of the motor vehicle can be actuated also from the rear of the exterior rearview mirror. Of course, the receiver 16 can also be provided at the leading side 18 (in relation to the direction of travel of the vehicle) of the mirror support 1. It is also possible to provide at least one receiver 16 at both sides 17 and 18 of the mirror support 1.

Since motor vehicles, in general, have a right and a left exterior rearview mirror, advantageously both exterior rearview mirrors may be embodied as disclosed. Thus, the respective locking and safety devices of the motor vehicle can be activated from both sides of the vehicle. The electrical line to the turn signal 10 onto and to the receivers 11, 11', 16 is guided through the mirror support 1 which is open at the side facing the motor vehicle for guiding them through the corresponding elements for folding the mirror head 2 as well as for adjusting the holder 4 for the mirror pane 6. Thus, this opening of the exterior rearview mirror can also be used for electrical lines. Thus, it is not necessary to provide the body of the vehicle with further holes which subsequently must be treated in order to prevent corrosion problems. Since the exterior rearview mirror is hollow, the thus provided inner space can be used for mounting the turn signal light 10 and the receivers 11, 11', 16. The turn signal light 10 positioned within the mirror head 2 thus increases the traffic safety of the vehicle substantially.

The turn signal light 10 can be integrated into the electric circuit of the main turn signals of the motor vehicle. In this case, the turn signal light 10 is a repetitive turn signal which is illuminated upon actuation together with the main turn signals of the motor vehicle. However, it is also possible to provide a separate circuit for the turn signal light 10. In this case, it can be used as an independent turn signal. It is also possible, inasmuch as government regulations allow this, to equip the vehicle only with the turn signal light 10 provided within the exterior rearview mirrors.

The exterior rearview mirrors are mounted with their mirror support 1 at the forward area of the side windows at the vehicle door in a manner known per se.

The present invention is, of course, in no way restricted to the specific disclosure of the specification and drawings, but also encompasses any modifications within the scope of the appended claims.

What we claim is:

1. An exterior rearview mirror for a motor vehicle, said exterior rearview mirror comprising:

a mirror support;

a mirror housing connected with a first end to said mirror support;

said mirror housing having a mounting chamber with a light-transmissive window and a holder for a mirror pane;

a turn signal light positioned in said mounting chamber behind said window;

two first receivers for receiving wireless remote control signals positioned in said mounting chamber behind said window;

wherein said two first receivers are spaced from one another;

wherein said window, at least in an area where said two first receivers are positioned, is transmissive for said wireless remote control signals;

wherein said two first receivers have overlapping receiving ranges.

2. An exterior rearview mirror according to claim 1, wherein said window is colored.

3. An exterior rearview mirror according to claim 1, wherein said window is located at a second end of said mirror housing remote from said mirror support.

4. An exterior rearview mirror according to claim 1, wherein said mirror housing has a leading face in a direction of travel of the motor vehicle and wherein said window is positioned in said leading face.

5. An exterior rearview mirror according to claim 4, wherein said window is curved in a direction opposite said direction of travel toward a second end of said mirror housing remote from said first end.

6. An exterior rearview mirror according to claim 1, wherein said window is curved in the vertical direction.

7. An exterior rearview mirror according to claim 1, wherein said turn signal light comprises at least one LED.

8. An exterior rearview mirror according to claim 1, wherein said turn signal light is comprised of a light-guiding material.

9. An exterior rearview mirror according to claim 1, wherein said turn signal light is comprised of a neon light.

10. An exterior rearview mirror according to claim 1, further comprising a second receiver for receiving remote control signals, said second receiver positioned within said mirror support.

11. An exterior rearview mirror according to claim 10, wherein said mirror support has a rearward side relative to a direction of travel of the vehicle and wherein said second receiver is positioned at said rearward side.

12. An exterior rearview mirror according to claim 1, wherein said turn signal light is integrated into an electrical circuit for switching main turn signals of the vehicle.

13. An exterior rearview mirror according to claim 1, wherein said turn signal light comprises a separate circuit connected to a current supply of the vehicle.

14. An exterior rearview mirror according to claim 1, wherein at least one of said two first receivers is a part of a door locking mechanism of the vehicle.

15. An exterior rearview mirror according to claim 14, wherein at least one of said two first receivers is furthermore a part of a safety mechanism of the vehicle for preventing unauthorized use of the vehicle.

16. An exterior rearview mirror according to claim 1, wherein at least one of said two first receivers is a part of a safety mechanism of the vehicle for preventing unauthorized use of the vehicle.

* * * * *